Figure 1:
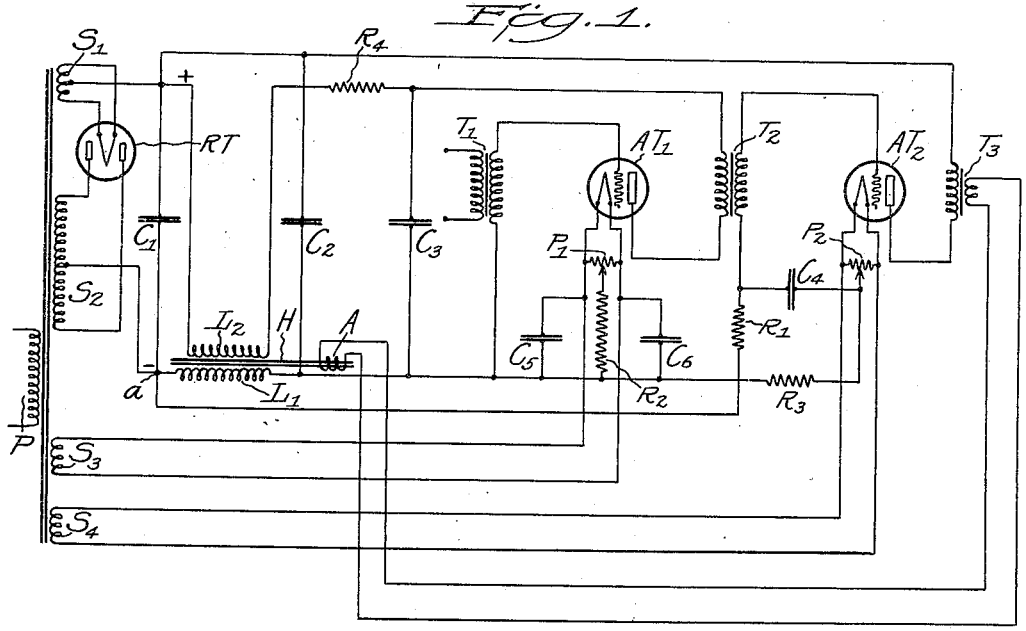

Feb. 1, 1938.  B. F. MIESSNER  2,107,125
AMPLIFYING AND REPRODUCING SYSTEM
Original Filed Jan. 25, 1929

WITNESS
Oliver W. Holmes

Inventor
BENJAMIN F. MIESSNER
By Attorney

Patented Feb. 1, 1938

2,107,125

UNITED STATES PATENT OFFICE 2,107,125

AMPLIFYING AND REPRODUCING SYSTEM

Benjamin F. Miessner, Short Hills, N. J., assignor, by mesne assignments, to Radio Corporation of America, New York, N. Y., a corporation of Delaware Application January 25, 1929, Serial No. 334,870
Renewed June 4, 1935

4 Claims. (Cl. 250—27)

The present invention relates generally to amplifying and reproducing systems, and more particularly to such systems employing multiple electrode vacuum tube amplifiers having the electrodes energized for operation from fluctuating sources of potential and reproducing devices also requiring energizing, such as electrodynamic reproducers.

More particularly the invention contemplates simplifying such systems and reducing the cost thereof by utilizing some of the component apparatus parts in a multiplicity of functions in novel manners.

Other objects and advantages will be obvious from the description in connection with the figures of the accompanying drawing in which like reference characters represent like parts so far as possible in the several figures.

Fig. 1 diagrammatically illustrates an audio frequency three electrode vacuum tube amplifying system followed by an electrodynamic reproducer connected to embody the invention in one form.

Figure 2:
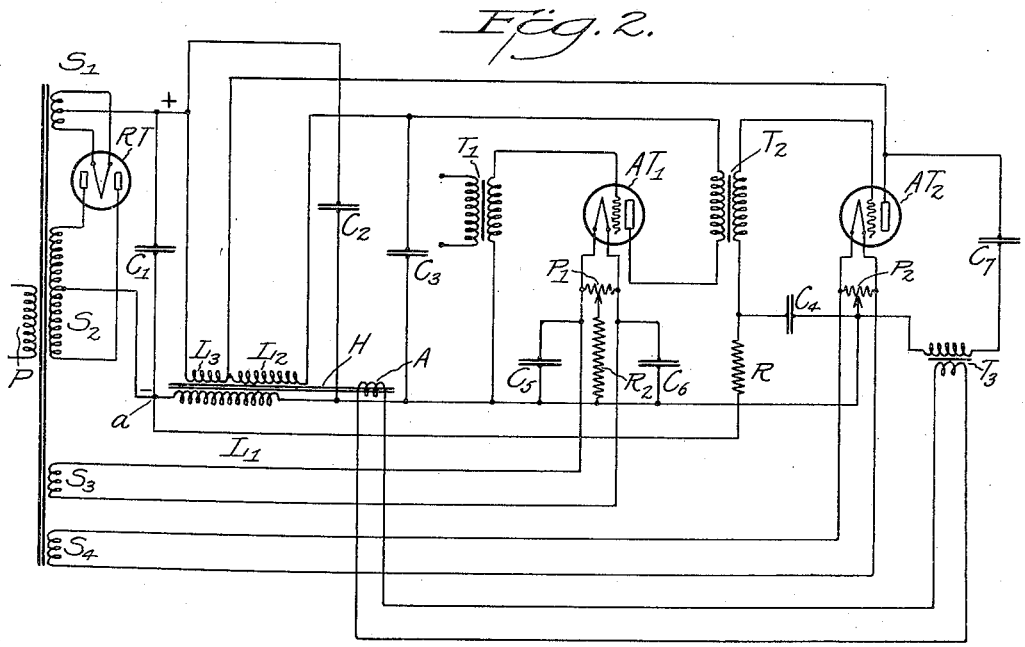

Fig. 2 illustrates a modification in extension of the system of Fig. 1.

Referring to Fig. 1 three electrode vacuum tubes $AT_1$ and $AT_2$ are shown connected in cascade for audio frequency amplification with the aid of audio transformers $T_1$, $T_2$ and $T_3$ in a well-known manner. The tubes are shown energized from an alternating current source, such as a commercial 60 cycle system, through transformer having primary winding P, the filaments of the tubes being heated with raw alternating current from secondary windings $S_3$ and $S_4$. A rectifier tube RT is energized from secondary windings $S_1$ and $S_2$, the rectified current from which is utilized to energize the plate and grid electrodes of the tubes after filtration later to be described.

Coils $L_1$ and $L_2$ are two coils on a field core H of an electrodynamic reproducer having a movable or armature coil A, usually attached to a cone or diaphragm for sound reproduction. A condenser $C_1$ across the output of the rectifier stores unidirectional energy and by-passes fluctuations to start the filter system. Coil $L_1$, in the negative leg of the filter, acts as a filter inductance in addition to being a field coil of the reproducer, and further may be designed with proper resistance to produce the required difference of potential for negatively biasing the grid of tube $AT_2$, or to cooperate with a smaller than usual biasing resistance $R_3$, to this end by reason of the grid circuit of tube $AT_2$ being connected to the point $a$ at the negative side of coil $L_1$ as shown.

Coil $L_2$, the second winding on the reproducer field core H, is so wound and connected in the upper leg of that component of the filter system supplying plate current to tube $AT_1$ that its field is preferably additive to the field of coil $L_1$ in order to meet the usual requirement in electrodynamic reproducer operation of having a strong field. Thus in addition to serving as a reproducer field coil it acts as a filter inductance for the plate current of tube $AT_1$, or the plate circuits of a multiplicity of amplifier tubes, as when the amplifying system includes one or more stages of radio frequency amplification. The winding of coil $L_2$ may have such resistance that by itself it reduces the potential of the output of the rectifier tube RT a desired amount, it being usual to operate amplifying tubes preceding the last stage at plate potentials that are considerably less than the plate potential of the usual power tube in the last stage, or its resistance may be combined with a supplementing resistance $R_4$ for the purpose of obtaining the required potential reduction.

Condenser $C_2$ is an additional filter condenser for the plate current supplied to tube $AT_2$, and condenser $C_3$ is an additional filter condenser for plate current supplied to tube $AT_1$. Since the fluctuating current in the plate circuit of tube $AT_1$ is amplified in tube $AT_2$ it is desirable to filter for this tube more than for tube $AT_2$, and the extra filtering in coil $L_2$ aids to this end as well as does making the capacity of condenser $C_3$ of sufficiently large value to proportion the filtering as desired. If the fluctuations from tube $AT_1$ are introduced into the grid circuit of tube $AT_2$ in proper phase to oppose the fluctuations in the plate circuit of tube $AT_2$ this proportioning is of particular value for neutralizing hum producing currents, a feature I have fully disclosed in prior applications of mine. This opposing or bucking effect permits of using condensers of capacity smaller than usual in positions $C_1$, $C_2$ and $C_3$.

Resistance $R_1$ and condenser $C_4$ serve to filter the grid biasing potential of tube $AT_2$ developed in coil $L_1$ alone or supplemented by resistance $R_3$, and $C_4$ additionally serves as a low impedance by-pass to the filament of signaling currents in the grid circuit of tube $AT_2$. $R_2$ is a grid bias producing potential resistance for tube $AT_1$, and condensers $C_5$ and $C_6$ serve to by-pass signal currents around this resistance and around potentiometer $P_1$. Potentiometers $P_1$ and $P_2$ provide for selecting the points of connections of grid and plate circuits to the filaments of tubes $AT_1$ and $AT_2$, and the connections may be displaced from the mid point or neutral for bucking of fluctuations produced in the filaments of one tube by fluctuations produced in the filaments of one or more other tubes, as disclosed in prior applications of mine.

Tube $AT_2$ transfers the amplified signals for reproduction to movable coil A of the reproducer by way of transformer $T_3$, and residual fluctuating currents in the output of tube $AT_2$ may be used to oppose the effect of the fluctuating field produced by field coils $L_1$ and $L_2$ by so poling transformer $T_3$ to introduce the output fluctuations into coil A out of phase with the field fluctuations.

It is thus seen that the arrangement provides for doing away with the usual use of separate choke coils at $L_1$ and $L_2$ or equivalent points in the filter; avoids separate excitation of the reproducer field coils or the use of additional filtered current for these coils; saves the use of a grid bias producing resistor for the output tube; and saves the use of a potential reducing resistor in the filter supply lead to the plate of tube $AT_1$.

The general features of Fig. 2 are substantially those stated in detail as to Fig. 1. I have not shown the supplementing resistances $R_3$ and $R_4$ of Fig. 1 in Fig. 2, it being understood that my invention contemplates in one form designing the resistances of the coils to by themselves produce the required differences of potential for grid biasing and plate potential reduction.

In Fig. 2 the field winding of the reproducer is shown to include a third section $L_3$ which is shown so connected that in addition to the functions of producing a field for the reproducer, filtering the plate currents of both tubes $AT_1$ and $AT_2$ and reducing plate potential, it functions as the choke for a choke and condenser output coupling for tube $AT_2$, condenser $C_7$ of low impedance to audio frequency signaling currents serving as the capacity element of the coupling. With this coupling the direct current component of the plate current of tube $AT_2$ is prevented from flowing through the primary of output transformer $T_3$, thus avoiding the difficulties of saturation effects had with transformers in the output circuit of power amplifier tubes.

It is evident from the foregoing that my invention provides for many economies and simplifications in the elaborate and complicated systems which have been brought into use in connection with completely energizing amplifiers and electrodynamic reproducers from commercial alternating current supply.

Having fully described my invention, I claim:

1. An amplifying and reproducing system including a plurality of multi-electrode electron discharge tubes having output circuits and a sound reproducer having a plural section field winding, a source of unidirectional pulsating current for energizing the output circuits of said tubes, and a filter circuit connected to the positive and negative terminals of said source interposed between said source and said output circuits, one section of said field winding being series connected in the negative line of said filter and another section being series connected in the positive line thereof, said sections being so connected that the fields resulting from the flow of filter current therethrough are additive, the last winding section having an intermediate tap connected to the anode of the last of said tubes, the anode of a preceding tube being connected to the negative side of said last section, and the positive side of the latter being connected through a condenser to the positive side of the first winding section.

2. In an amplifying and reproducing system, a plurality of multi-electrode electron discharge tubes each thereof having input and output circuits, a sound reproducer having a plural-section field winding, rectifying means adapted to be connected to a source of alternating current supply for potentializing at least some of the electrodes of the electron discharge tubes, said plural-section field winding being conductively connected to said rectifying means, and means connecting an intermediate point of one section of the plural-section field winding to one of the electrodes of one of the electron discharge devices.

3. In an amplifying and reproducing system, an output tube having an anode, a cathode and a control electrode, an intermediate tube having an anode, a cathode and a control electrode, a reproducer having a field winding, a rectifying system having a pair of input terminals and a pair of output terminals, said input terminals being adapted to be connected to a source of alternating current whereby there becomes available across said output terminals uni-directional pulsating current, one of said output terminals being of positive potential with respect to the other output terminals, a connection including said field winding between the said negative terminal and the cathodes of said tubes, capacitive means connected between the positive terminal and the negative terminal for smoothing the uni-directional current, a connection including an inductance winding between the positive terminal of the source and the anode of said second named tube and a conductive connection between the anode of the output tube and an intermediate point of the last named winding.

4. An arrangement as described in the next preceding claim characterized by that the two windings are coupled with relation to each other so that the fields resulting from the flow of current therethrough are additive.

BENJAMIN F. MIESSNER.